Sept. 4, 1956 K. A. LUNDKVIST 2,761,901

DEVICE FOR SETTING OF SELECTORS BY MEANS OF AUDIO-FREQUENCIES

Filed July 11, 1951 4 Sheets-Sheet 1

Inventor
K. A. Lundkvist
By Glascock Downing & Seebold
Attys.

Inventor
K. A. Lundkvist
By Glascock Downing & Seebold
Attys

Sept. 4, 1956 K. A. LUNDKVIST 2,761,901

DEVICE FOR SETTING OF SELECTORS BY MEANS OF AUDIO-FREQUENCIES

Filed July 11, 1951 4 Sheets-Sheet 3

Inventor

K. A. Lundkvist

By Glascock Downing & Seebold

Attys.

Sept. 4, 1956

K. A. LUNDKVIST 2,761,901

DEVICE FOR SETTING OF SELECTORS BY MEANS OF AUDIO-FREQUENCIES

Filed July 11, 1951

4 Sheets-Sheet 4

Inventor
K. A. Lundkvist
By Glascock Downing & Seebold
Attys.

2,761,901

DEVICE FOR SETTING OF SELECTORS BY MEANS OF AUDIO-FREQUENCIES

Karl Axel Lundkvist, Stockholm, Sweden, assignor to Telefonaktiebolaget L M Ericsson, Stockholm, Sweden, a company of Sweden Application July 11, 1951, Serial No. 236,237

Claims priority, application Sweden January 26, 1946

2 Claims. (Cl. 179—18)

This invention relates to automatic telephone systems of the type having a plurality of exchanges, and particularly to a signalling system for the setting of switches over transmission lines by means of alternating current signals composed of frequencies within the voice frequency range.

An object of the invention is to avoid the use of impulse series which must be repeated at the terminal points of the lines between the exchanges. This is achieved by arranging registers which set the outgoing communications from an exchange, at least partly with the help of continuously operative signals (preferably audio-frequency signals), and by arranging in each selection stage or tandem exchange a marked common to a group of incoming lines and containing a signal receiving device, to which marker a line is connected directly and solely by a call. The signal receiving device in the marker is actuated by a signal from the register connected to the outgoing end of the communication and each signal indicates a group of subscribers, e. g. a network or a called exchange in a network. The marker connects the calling line over a selector to a trunk over which the group of subscribers represented by the signal can be reached.

Another object of the invention is to reduce the time required for the setting of a communication. This is achieved by using cross-bar switches, controlled by markers, which markers receive signals directly from the transmission lines without using incoming registers to receive, record and repeat the signals.

Another object of the invention is to provide that all signals sent out from a register cause a selection. For this purpose the marker for a selection stage contains means for sending a revertive signal to the register in the calling exchange. This signal is set only if the called group of subscribers is reached in the selection stage, and if a further selection stage must be passed the signal is suppressed and the same continuously operative signal above mentioned actuates the signal receiving device in the marker for a following selection stage. Consequently the same signal can set selectors in several selection stages and in several tandem exchanges. This is of special interest by alternative routing.

The invention can be used for junction traffic as well as for local calls. Inasmuch as very quick switching operations can be obtained, the connections need not usually be started before all figures in the called subscriber's number are recorded in a register in the calling exchange. There is therefore always one signal connected to the communication, and a seized marker is immediately actuated.

The invention will best be understood from the following detailed description of a preferred embodiment thereof, reference being had to the appended drawings, in which.

Figure 5:
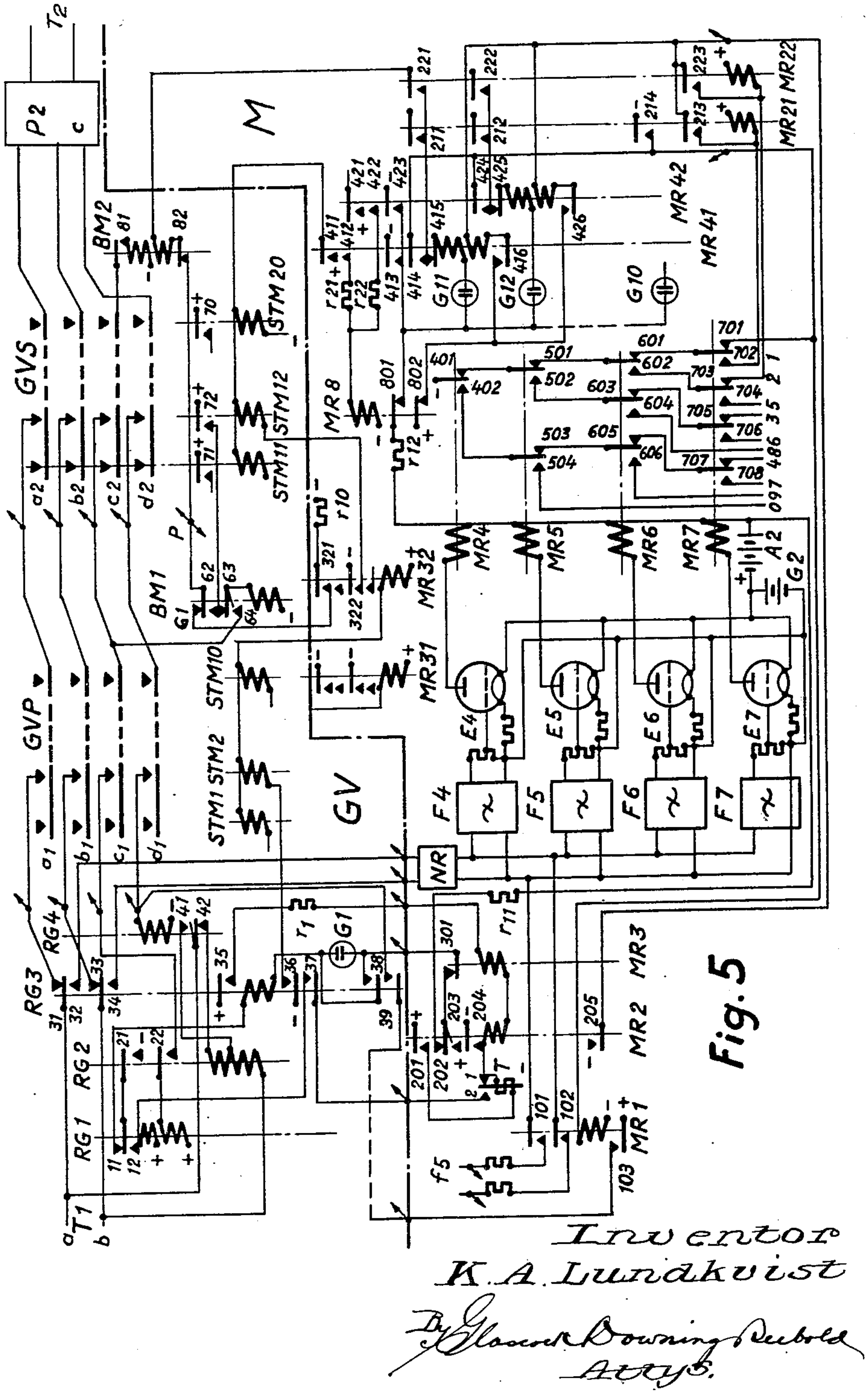

Fig. 5 shows a selection stage GV and a marker M pertaining to said selection stage. A trunk T1 with relays RG1—RG4 are shown in the selection stage. The trunk T1 is made for direct current signals, but can naturally be made for any kind of signalling, e. g. audio-frequency. Instead of the trunk T1 and the relays RG1—RG4, a carrier frequency channel can be adapted on a physical communication or a wireless communication.

In Fig. *Ab* is a subscriber's line. Upon calling the subscriber's line *Ab* is connected to the marker M3, which connects the subscriber's line *Ab* to a register Reg over the switches SLS, SLP and RS and a connecting link SNR. The register Reg is set by means of the subscriber's dial. After all the figures in the called subscriber's number having been received, Reg connects to the marker M1 over a contact device *k*1 and sets said marker, which in its turn sets the switches GVP1 and GVS1. The marker M1 is then released. There is thereafter in the register Reg such a switching that the following selection stages are set by means of audio-frequencies. By outgoing communications a line L1 has been chosen by the selectors GVP1 and GVS1. Line L1 connects as soon as it is seized to marker M4 over contact device *k*5. The marker M4 is set by means of an audio-frequency signal from the register Reg, which operation will be described with reference to Figs. 4 and 5. The marker M4 connects the selectors GVP3 and GVS3, e. g. to the line L3, and is thereafter released from the connection. The switching operation can then be repeated in an arbitrary number of selection stages. By incoming communications, the telephone exchange is called over a line L2, connected to the marker M2 over a contact device *k*3. By internal communications, an internal line L4 coming from the selector GVS1 is connected over a contact device *k*2 to the marker M2. In both cases the marker M2 is set by means of an audio-frequency signal from a register and thereafter sets the selectors GVP2 and GVS2 so that the calling lines L2 resp. L4 are connected to an intermediate link SNT. The link SNT is connected over a contact device *k*4 to a marker M3, which is set by at least one audio-frequency signal from the register. The marker M3 thereafter sets the selectors LVS, SLP and SLS so that the connection is extended to a called subscriber, the marker M3 thereafter being released.

Figure 1:
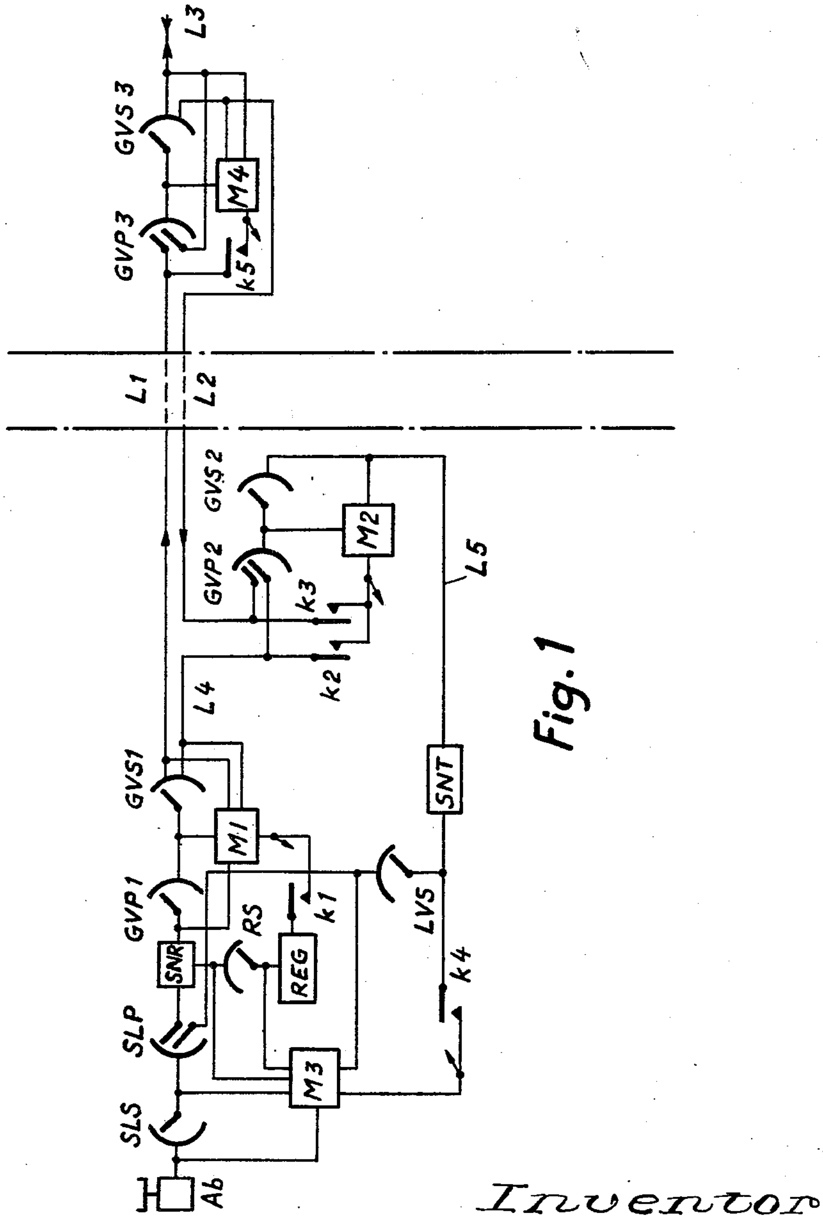
Fig. 1 shows the connection paths as well within as from and to an automatic telephone exchange with cross bar switches. The selection stages are made of primary (GVP) and secondary (GVS) operating bars for cross bar switches, e. g. according to Fig. 3.
Figures 2, 3:
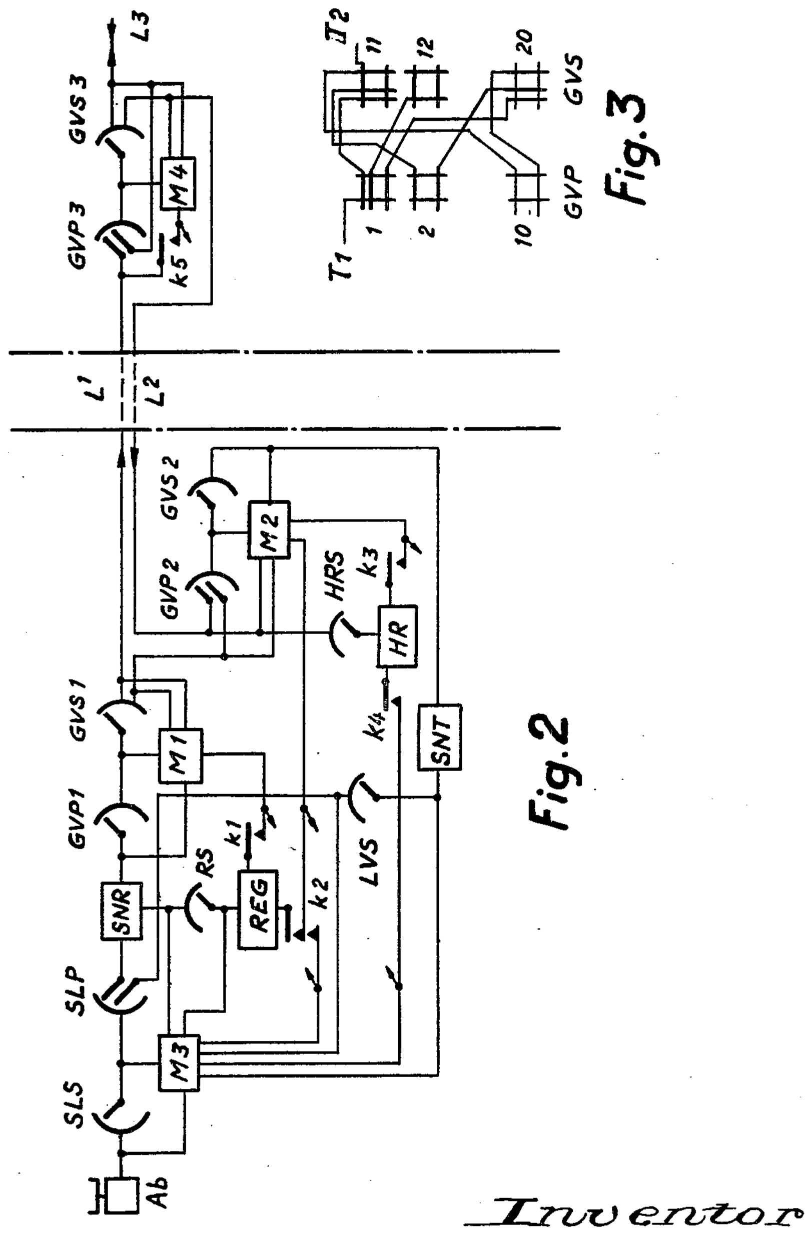
Fig. 2 shows the same exchange as Fig. 1 but with another switching operation for the internal and the incoming connections. The selection stages are also supposed to be made according to Fig. 3.

The above described switching operation presupposes that the registers do not start a connection before all the figures in the called subscriber's number have been received. A marker is viz common to a great number of lines and may not be seized unnecessarily. Thus, the registers must decide, whether all the figures have been received or not. It is not always possible to achieve this technically for large telephone networks and therefore a system arranged according to Fig. 2 is preferable in such cases. The register Reg takes care of all internal connections by connecting itself directly to the corresponding marker. The register Reg connects first over contact device *k*1 to the marker M1 and then also over contact device *k*2 to the markers M2 and M3. A connection is then chosen over the link circuit SNR and the selectors GVP1, GVS1, GVP2, GVS2, LVS, SLP and SLS to the called subscriber, Reg, M1, M2 and M3 then being released. By separating the contact device *k*1 and *k*2, incoming and outgoing communications can be set up simultaneously. Incoming communications, e. g. from line L2, are connected over a line-finder HRS to a help-register HR containing a signal receiving device, by means of which audio-frequency signals can be received and registered in the help register. The help register HR can easily determine when all the necessary signals have been received, and then connects itself over the contact devices *k*3 and *k*4 to the markers M2 and M3, which set the selectors GVP2 and GVS2, resp. LVS, SLP and SLS. Outgoing communications are carried through in quite an analogous way as has been described above for Fig. 1.

In the following description for Fig. 5, it is supposed that a selection stage is arranged according to Fig. 3. The incoming lines are connected to selecting bars in the cross bar switches GVP1—10 and the outgoing lines to operating bars in the cross bar switches GVS11—20. The primary crossbar switches GVP and the secondary GVS are connected by means of links according to the figure. The incoming trunk T1 in Fig. 5 can be either L1 or L4 in Fig. 1 and the outgoing trunk T2 can be either L2, L3 or L5 in Fig. 1.

Figure 4:
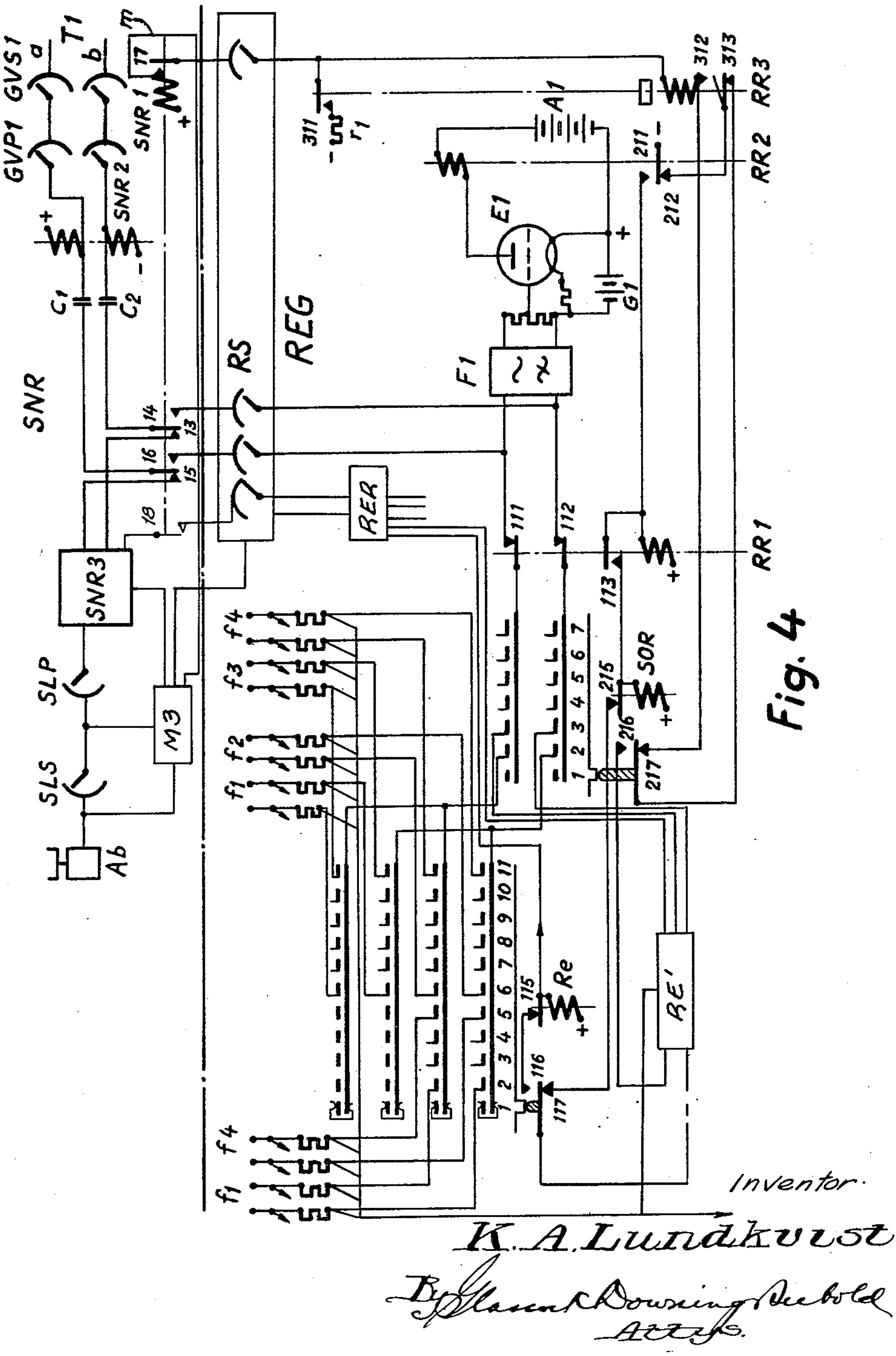
Fig. 4 shows the circuits important for the invention for a register Reg and a connecting link SNR, which can be connected to the register Reg.

Fig. 4 shows the outgoing terminal of a connecting link SNR, which can be connected to a register Reg. To make it simpler only the circuits important for the invention are shown. A free connecting link SNR with free register is selected and marked busy over a marking wire *m* from the marker M3 by connection of battery. Thereafter the marker M3 sets the selector RS to connect the selected link to the register. A calling subscriber A*b* is connected to the link over switches SLS and SLP. The connecting link comprises two relays SNR1–SNR2 and a set of relays SNR3 for feeding, holding and signalling. Relay SNR1 actuates its armature when the link SNR is selected by the marker M3 and the contacts 13—18 are operated. The outgoing side of the talking wires *a* and *b* of the connection are thereby connected to the register over the contacts 14 and 16 and the switch RS, which has been set by the marker M3. The following circuit is completed: +, winding on relay SNR1, contact 17, RS, winding on relay RR3, contacts 217, 313 and 212 to negative. Relay RR3 actuates its armature and contacts 311—313 are operated. + and negative are the poles of the exchange battery. There are moreover two batteries G1 and A1, which are a filament battery and an anode battery for the electron tube E1. The register Reg is set by impulses from the calling subscriber's dial through circuits, which are not shown in the figure. The selectors R*e* and R*e'* are hereby also set by means of impulses over contact 18 and a relay set RER *i* to some of the positions 2—11. After a certain number of figures having been received, e. g. all the figures indicating the number of the called exchange, the sequence switch SOR is moved one step by means of an impulse on wire *s*. When SOR is in position 2, an audio-frequency signal is emitted, which indicates the figure registered in the selector R*e*. If said figure has any of the values 1—4, one of the frequencies *f*1—*f*4 are emitted. R*e* is then in one of the positions 2—5. If the figure has any of the values 5—0, R*e* is in one of the positions 6—11 and a combination of two of the frequencies *f*1—*f*4 are emitted, e. g. *f*1 and *f*2 or *f*3 and *f*4. The frequencies are emitted from generators with low internal resistance over series resistances shown in the figure and having the object of preventing the frequencies *f*1—*f*4 to intermingle via the generators. The audio-frequency signal passes through the following circuit: e. g. the generator for frequency *f*1, series resistance, position 2 in R*e*, position 2 in SOR, contacts 111 and 112, RS, contacts 14 and 16, condensers C1 and C2, selectors GVP1 and GVS1 to talking wires *a* and *b*. The selectors GVP1 and GVS1 are set with the aid of the marker M1 shown in Figure 1 and Figure 2. None of the frequencies *f*1—*f*4 passes through the high-pass filter F1 to the electron tube E1. When the switching operations are over, which are to be carried by the audio-frequency signal over the selector R*e*, there comes an audio-frequency signal of higher frequency than any of the frequencies *f*1—*f*4 over the talking wires *a* and *b*. Said audio-frequency signal passes the high-pass filter F1 and actuates the electron tube E1 so that relay RR2 actuates its armature. Contact 211 is thus closed, and relay RR1 operates its armature. The contacts 111—113 are actuated, the magnet of sequence switch SOR receiving current and actuating its armature. The sequence switch SOR is supposed to be made so that it moves its wipers first when the magnet releases its armature. Contacts 111 and 112 however broke the audio-frequency signal, which entails that audio-frequencies coming from outside through the filter F1 will also cease, the grid potential of the tube E1 is decreasing to a negative potential, and relay RR2 releases its armature. Relay RR1 releases its armature and sequence switch SOR moves to position 3, a new audio-frequency signal being emitted in dependence upon the setting of another selector R*e'*. During the time in which relay RR2 keeps its armature actuated, the contact 212 is actuated and the circuit is broken for relay RR3. Relay RR3 is however slow and has not time to release its armature, if the audio-frequency signal to relay RR2 does not surpass a certain length, and a long signal not immediately ceasing when the contacts 111—112 are operated means that it has been emitted in the last selection stage of the communication. As long as relay RR3 keeps its armature actuated, relay SNR1 will be kept by contact 311 in series with resistance *r*1. On relay RR3 releasing its armature ensuing from a long signal to relay RR2, relay SNR1 also releases its armature and disengages the register Reg from the communication. The selectors R*e* and SOR are restored to normal by circuits over zero-position contacts 116—117 and 216 together with self-operating contacts 115 resp. 215. As appears from the figure, the filter F1 is terminated by a resistance, acting partly as terminal resistance and partly as voltage divider for setting of a suitable sensitivity for the electron tube E1.

Fig. 5 shows the switching operation in a selection stage made of primary and secondary cross bar switches according to Fig. 3. The switching stage can be placed anywhere in the system, e. g. it can be GVP2 or GVS2 or GVP3—GVS3 in Fig. 1 and an arbitrary number of switching stages according to Fig. 5 can be connected in series. When the line T1 is seized a battery is connected to the line circuit e. g. over the windings on relay SNR2 in Fig. 4. Relay RG2 thereby actuates its armature in the following circuit: +, winding on relay SNR2, *a*-wire, contact 42, the two windings on relay RG2, *b*-wire, winding on relay SNR2 to negative. Contacts 21 and 22 are closed. The following circuit is completed: negative, contacts 21 and 11, winding on relay RG3, discharge lamp G1, contacts 301 and 202, resistance *r*11, anode battery A2 for the tubes E4—E6, to +. Discharge lamp G1 glows and relay RG3 attracts its armature. The resistance *r*11 is chosen so that normally only one discharge lamp G1 can glow at a time. Contacts 31—39 are actuated. Discharge lamp G1 is short-circuited. The following circuit is completed: +, contact 35, resistance *r*1, winding on relay MR3, winding on relay MR2, contact 1 on thermo-contact T, to negative. Relay MR2 attracts its armature. Contacts 201—205 are operated, the circuit for relay RG3 thereby being switched from contact 202 to contact 203. The resistance *r*1 is chosen so that relay MR3 does not attract its armature without two or more contacts 35 being closed simultaneously, i. e. that more than one discharge lamp G1 glows. Should that be the case, contact 301 breaks the test circuit to the marker M and the test operation must be repeated until only one discharge lamp G1 keeps glowing. Such a retesting is very rare. Relay MR2 is held over contact 204 and thermocontact T receives current over contacts 201 and 204.

On contacts 32 and 34 closing, the audio-frequency signal incoming over the talking wires $a$—$b$ is connected over level regulation NR to a signal receiving device composed of four electron tubes E4—E7 with pertaining filters F4—F7 and relays MR4—MR7. Each of the filters F4—F7 lets pass one of the frequencies $f1$—$f4$ in Fig. 4. The incoming audio-frequency signal comprises either only one of the frequencies $f1$—$f4$, or a combination of two of them. For the figure 2, for instance, there is only the frequency $f2$ and only relay MR6 is actuated. For the figure 0 there are the frequencies $f3$ and $f4$, and therefore relays MR4 and MR5 are actuated simultaneously. All the filters F4—F7 are terminated with charge resistances which are used for adjustment of the sensitivity of the receiving devices. The electron tubes are fed from the filament battery G2 and the anode battery A2.

The selection stages are here supposed to be built in decades, which naturally is nothing absolutely necessary for the invention. Since 15 different combinations can be obtained with four frequencies, as well more as less than 10 directions of traffic can be arranged from each selection stage.

In the following, it is presumed that the audio-frequency signal corresponds to the digit 2. Relay MR6 attracts its armature. Contacts 601—606 are operated. The following circuit is completed: negative, contacts 401, 501, 602 and 703, winding on relay MR22, to +. Relay MR22 attracts its armature and contacts 221—223 a. s. o. are closed. Relay MR22 has a contact for each line T2 belonging to the direction of traffic corresponding to the digit 2 and which can be reached over the group selector GV relay MR22 is held over contacts 223 and 205. On contact 36 being operated, the following circuit has been completed: negative, contact 36, winding on selecting magnet STM2, winding on relay MR32, to +. Selecting magnet STM2 attracts its armature and indicates the contact spring sets, to which line T1 is connected. Relay MR32 attracts its armature. Contacts 321—322 and others are closed. Negative is connected via resistance $r$10 over contacts 321 to contact 61 on the operating magnet BM1 for all operating bars GVP, which can be connected to line T1. Negative is connected over contacts 322 to all the selecting magnets corresponding to STM12 and indicating contact spring sets connected with one of said operating bars. According to Fig. 3, each operating bar BM1 corresponds to a selecting magnet STM12. At the point P contacts 61 resp. 82 for all the primary and secondary operating bars are connected together.

On relay MR22 attracting its armature, contacts 221—222 are closed, completing test circuits for selection of a free line T2. In Fig. 5, one only of said circuits is completely shown, viz.: +, battery A2, resistance $r$12, contact 801, discharge lamp G11, winding on relay MR41, contacts 415 and 221, winding on operating magnet BM2, contacts 82, 61 and 321, resistance $r$10 to negative. Simultaneously, a corresponding circuit is completed over discharge lamp G12 and winding on relay MR42. Resistance $r$12 is chosen so, that normally only one discharge lamp can glow. It is here supposed, that the discharge lamp G11 glows and that relay MR41 attracts its armature. Contacts 411—416 are operated. All the discharge lamps are short-circuited by contact 413. Relay MR41 is held in the following circuit: +, contacts 802 and 416, winding on relay MR41, contact 205 to negative.

On contact 412 closing relay MR8 receives current, but is not operated. Should however two discharge lamps, e. g. G11 and G12, glow simultaneously causing two relays MR41 and MR42 to attract their armatures, relay MR8 will receive current over resistance $r$22 also, and attract its armature. Contacts 801 and 802 will then break, relays MR41 and MR42 release their armatures and the test operation will have to be repeated.

On contact 411 closing, selecting magnet STM12 attracts its armature and indicates the contact spring set on the operating bar BM2 corresponding to the operating bar BM1. The following circuit is completed: +, contacts 72 and 63, winding on operating magnet BM1, to negative. The magnet BM1 attracts its armature. Contacts 61—64 are operated. Magnet BM1 is held over contact 64, contact strip C1, contact 22, winding on relay RG1, to +. Relay RG1 however does not attract its armature. The following circuit is completed: +, contacts 72, 62, and 82, winding on magnet BM2, contacts 221 and 414, winding on relay MR1 to negative. Relay MR1 attracts its armature, but not magnet BM2. Contacts 101 and 102 are closed and an audio-frequency signal with the frequency $f5$ is emitted via two series resistances and the level regulation NR to line T1. The audio-frequency signal from the register ceases, relay MR6 releases its armature, winding on relay MR1 is short-circuited by negative over contacts 401, 501, 601, and 701, operating magnet BM2 attracts its armature and is held over contact 81 and contact strip C2. Relay RG1 now receives enough current to attract its armature. Contact 11 breaks the circuit for relay RG3, which releases its armature, and relay RG1 is held over contact 12. The marker M is released and its relays release their armatures.

If the switching operation in the marker M has not been completed before thermo-contact T being operated, the following circuit is completed: negative, contact 2, contact 37, winding on relay RG1, to +. Relay RG1 attracts its armature, the marker is released and line T1 cut out.

Had the digit 1 been received in the marker instead of the digit 2, relays MR7 and MR21 would have attracted their armatures instead of MR6 and MR22. There is on relay MR21 a contact 214, which short-circuits the winding on relay MR1 and therefore no audio-frequency signal with the frequency $f5$ is in said case emitted on line T1, but operating magnet BM2, and thereafter relay RG1, immediately attract after contact 62 having been closed. In said case lines T1 and T2 are connected together without the audio-frequency signal from the register being cut out.

I claim:

1. In an automatic telephone system a plurality of switching stages comprising cross bar switches and a marker, a receiver in said marker responsive to audio frequency signals, a plurality of routing relays connected to said receiver, a plurality of trunk selecting relays connected to be actuated by said routing relays, trunk lines for connecting the said switching stages, a relay for each of the said trunk lines and responsive to the seizure of one end of a trunk line to connect the other end of said trunk line to a switching stage marker and to indicate the said connection, a register including means for sending a continuous audio frequency, switching means connecting said register to one of said trunk lines, the said relay in the said trunk line operating to complete a circuit between the said register and the said receiver in the marker corresponding to the switching stage in which the said trunk terminates, the said register sending out continuous audio frequency signals to a called switching stage and actuating a routing relay connected to said marker whereby the corresponding trunk selecting relay is connected to the trunks controlled by said routing relay, the said trunk relay selecting one of said trunks and connecting said register connected trunk to said one of said trunks, a revertive signal means in said marker adapted to operate when said relay selects a trunk terminating in said called switching stage, and control means in said register responsive to said revertive signal to disconnect said audio frequency signal.

2. An automatic telephone system according to claim 1, wherein the said register is in a calling exchange, said called exchange comprising a tandem switching stage, junction lines connecting said calling exchange and said tandem switching stage, trunks connecting said tandem switching stage and said called switching stage, the said control means in said register operated by said revertive signal and connecting a second audio frequency signal to said junction lines for setting the marker, and switches in the said called switching stage.

References Cited in the file of this patent

UNITED STATES PATENTS

| | | |
|---|---|---|
| 2,261,370 | Hersey et al. | Nov. 4, 1941 |
| 2,299,479 | Holden | Oct. 20, 1942 |
| 2,303,356 | Holden | Dec. 1, 1942 |
| 2,310,452 | Meacham | Feb. 9, 1943 |
| 2,326,458 | Hall | Aug. 10, 1943 |
| 2,326,478 | Meacham | Aug. 10, 1943 |
| 2,332,912 | Hecht et al. | Oct. 26, 1943 |
| 2,356,330 | Lundstrom | Aug. 22, 1944 |
| 2,388,347 | Staples et al. | Nov. 6, 1945 |